CRYOTRON OPERATING POINT STABILIZATION LOOP

Filed Dec. 28, 1962

3 Sheets-Sheet 1

INVENTORS
JOHN L. ANDERSON
JOHN J. LENTZ
BY
S. P. Tedesco
ATTORNEY

Oct. 18, 1966 J. L. ANDERSON ET AL 3,280,340

CRYOTRON OPERATING POINT STABILIZATION LOOP

Filed Dec. 28, 1962

3 Sheets-Sheet 3

United States Patent Office 3,280,340 Patented Oct. 18, 1966

3,280,340

CRYOTRON OPERATING POINT STABILIZATION LOOP

John L. Anderson, Poughkeepsie, N.Y., and John J. Lentz, Columbus, Ohio, assignors to International Business Machines Corporation, New York, N.Y., a corporation of New York Filed Dec. 28, 1962, Ser. No. 248,122
17 Claims. (Cl. 307—88.5)

This invention relates to control systems and, more particularly, to control systems for stabilizing the operation of cryogenic circuit devices regardless of variations in ambient temperatures.

Basically, the operation of cryogenic circuit devices, i.e. cryotrons, is based on the physical phenomenon of superconductivity which is that property of certain materials to exhibit no electrical resistance when maintained below a crtical transition temperature characteristic of the particular material. The critical transition temperatures of materials known to exhibit superconductivity range between 0.1° Kelvin and 17° Kelvin; at the critical temperature, and neglecting slight hysteretic effects, transition of a specimen between superconductive or resistanceless state and normal resistance state is very nearly discontinuous. While a specimen is maintained below its critical temperature, superconductivity can be destroyed by a sufficiently large magnetic field, generated either externally or directly by current flow within the specimen. The magnitude of this critical magnetic field $H_c$ and also the critical self-current $I_s$ required to destroy superconductivity varies inversely as the operating temperature at which the specimen is maintained and decreases to zero at the critical transition temperature.

It has been demonstrated that cryotrons can be employed to build large, high-speed computer assemblies. The structure and also a method of fabricating cryogenic assemblies or arrays by vapor deposition techniques has been described in a patent issued to Andrew E. Brennemann et al., Patent No. 3,090,023, which was issued on May 14, 1963. The power requirements of the cryogenic assemblies are very low since the individual cryotrons are refrigerated so as to be normally superconductive and exhibit no electrical resistance. Moreover, since transition between the superconductive and the resistive state is almost instantaneous, logical and memory functions of the computer assemblies can be performed at very fast speeds.

The principles of operation of cryogenic arrays, as hereinafter briefly described, is selective current switching between alternate parallel current paths defining a superconductive loop; each path of the superconductive loop includes as a segment the gate conductor of a cryotron. Basically, there are two real limitations on the switching speeds of cryotrons, i.e. that speed at which current can be switched between alternate current paths. A first limitation is due to the electromagnetic time constants of the superconductive loop; such time constants can, in principle, be greatly reduced through special cryotron design. In a simple analysis, the time required to drive current from one and along the other current path of a superconductive loop can be expressed by an inductive time constant $L/R$ where L is the inductance of the superconductive loop and R is the resistance introduced into the one current path, i.e. the normal resistance of the gate conductor, so as to force supercurrent entirely along the alternate current path. A fuller description of this inductive time constant and also of current switching in a superconductive loop may be had by reference to the M. Burns et al., Patent 3,215,967, which issued on November 2, 1965 and is assigned to a common assignee. The second limitation results from ohmic heating generated during dynamic operation of a cryotron. It has been estimated that one watt of power would be dissipated if $10^6$ cryogenic devices were to be switched $10^3$ times/sec. While such power consumption is relatively small, it is to be realized that very large numbers of cryotrons arranged in numerous arrays would be required in a computer assembly; moreover, cryotrons are extremely temperature sensitive and variations in the order of $10^{-3}$ degrees Kelvin can have a significant effect on their operation. Temperature requirements of cryogenic systems, therefore, are extremely critical, i.e. many orders of magnitude greater than those of comparable electronic systems.

In practice, a cryogenic array is deposited onto a substrate and refrigerated, for example, by immersion in a liquid helium bath. Ohmic heating generated during the dynamic operation of the cryogenic array is transferred to the array-supporting substrate and must be dissipated in the helium bath so as to maintain the cryotron array at a predetermined operating temperature. Due to thermal time constants of the system, however, temperaure gradients form within the helium bath. It is conceivable that ohmic heating generated by heavy swtiching of cryotrons within an array could possibly raise the local helium bath temperature to a level whereat superconductivity, for example, along the individual gate conductors is destroyed and information stored therein destroyed.

Also, the magnitude of the critical magnetic field $H_c$ and also critical self-current $I_s$ are temperature sensitive. Critical self-current $I_s$ is identified as the Silsbee current and defined as that current along a superconductive specimen sufficient to drive the specimen resistive in the absence of an externally applied magnetic field. Cryogenic systems generally are designed such that working currents $I_w$ supplied to a cryogenic array do not exceed the critical self-current $I_s$ of the individual gate conductors but are sufficient when directed along the individual control conductors to generate field far in excess, say 50%, of the critical magnetic fields $H_c$ required to switch the former. By providing such excess, proper switching of cryotrons in the individual arrays is insured regardless of variations in operating temperatures. Such design increases ohmic heating during dynamic operation of the cryogenic array. Due to thermal time constants of the system, however, the operating temperatures of the individual cryogenic arrays can differ appreciably and by different amounts from a designed operating temperature. Regulation of the helium bath temperature alone is not sufficient to stabilize the operation of each of the cryogenic arrays in the system.

One object of this invention is to provide for the immediate stabilization of the operation parameters of each of a plurality of cryogenic arrays refrigerated, for example, in a common helium bath.

Another object of this invention is to minimize ohmic heating during the dynamic operation of a cryogenic system.

Another object of this invention is to provide immediate stabilization of the operating parameters of each of a plurality of cryogenic arrays refrigerated, for example, in a common helium bath regardless of temperature gradients within the said bath.

Another object of this invention is to provide a very precise determination of variations in the temperature of a liquid helium bath; moreover, a related object of this invention is to provide a very precise determination of variations in the operating temperature of a cryogenic array.

These and numerous other objects of this invention are achieved by compensating the temperature of the helium bath with respect to that quantity of ohmic heating generated within the cryogenic system and, concurrently, compensating the working currents $I_w$ and/or the bias current $I_b$ individually supplied to the cryogenic arrays with respect to the local helium bath temperature. Moreover, during the time interval required to normalize helium bath temperature, the working currents $I_w$ and/or the bias currents $I_b$ are precisely determined with respect to the local helium bath temperature so as to minimize ohmic heating and insure proper operation of each cryogenic array. To this end, monitoring cryotrons are selectively positioned within the helium bath and also on each array-supporting substrate to monitor the bath temperature and the ambient temperature of the cryogenic array, respectively. As the operating characteristics of a monitoring cryotron are temperature sensitive, deviation of operating characteristics of a monitoring cryotron from a chosen norm indicates the magnitude of compensation to be provided to the cryogenic array or to the helium bath. Such deviation is ascertainable by determining either the magnitude of the critical magnetic field or the critical self-current necessary to destroy superconductivity along the gate conductor of the monitoring cryotron. For example, and in accordance with one aspect of this invention, a current $I_c$ of increasing amplitude, e.g. saw tooth, sinusoidal, step function, etc., is directed along the control conductor of the monitoring cryotron. The magnitude of the control current $I_c$ necessary to switch the associated gate conductor resistive provides a precise indication of the operating temperature of the monitoring cryotron and, therefore, the degree of compensation to be provided the cryogenic array and/or helium bath.

The process by which the operation of the cryogenic array is stabilized is two fold. Firstly, the temperature of the helium bath is controlled, either on a localized or overall basis, in accordance with the quantity of ohmic heating generated within the system so as to establish each of a plurality of cryogenic arrays at an optimized or mean operating temperature. Due to the thermal time constant in the system, however, there is a lag in establishing the helium bath at the optimized temperature. During this lag, and also to stabilize the operation of individual cryogenic arrays at the optimized temperature, working currents $I_w$ and/or bias currents $I_b$ supplied to each of the arrays are regulated so as to insure proper operation and minimize ohmic heating.

The foregoing and other objects, features, and advantages of the invention will be apparent from the following more particular description of preferred embodiments of the invention, as illustrated in the accompanying drawings.

Figure 4A:
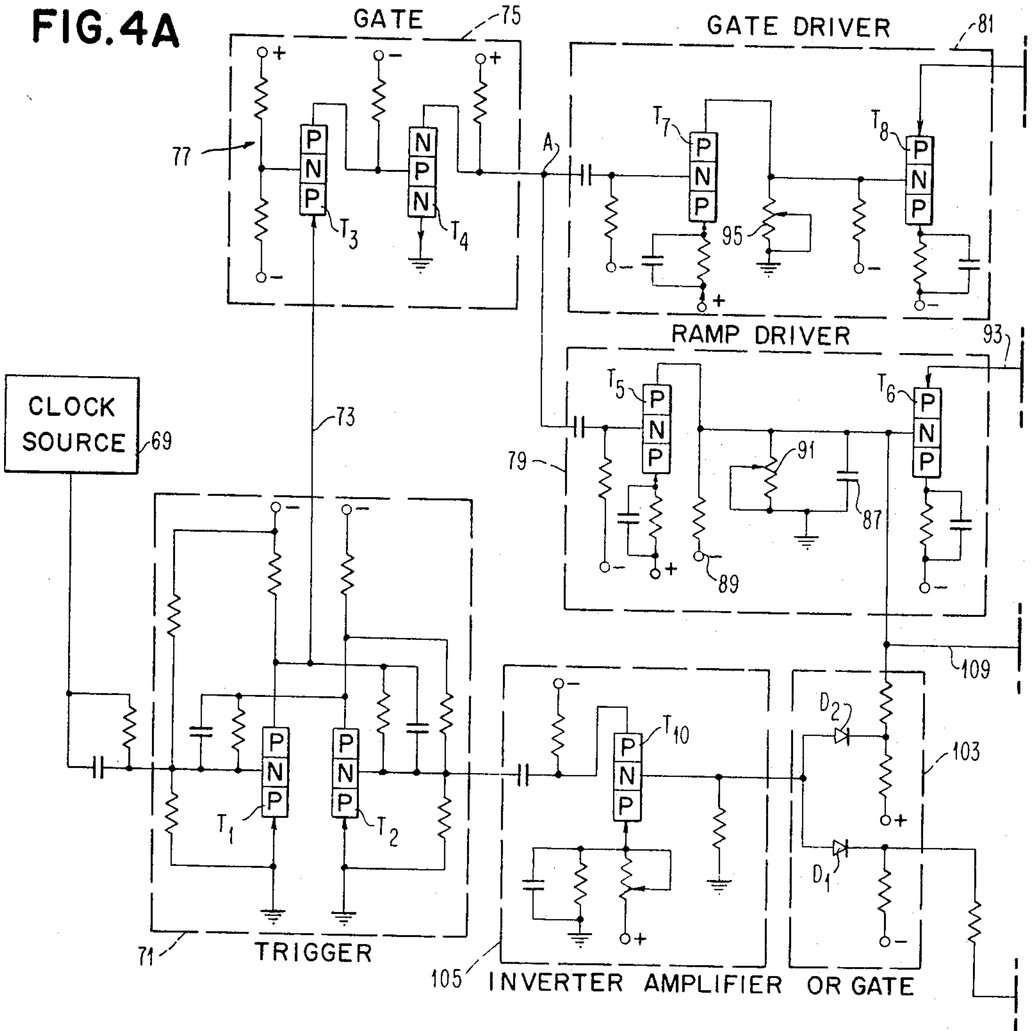
Figures 4, 4B:
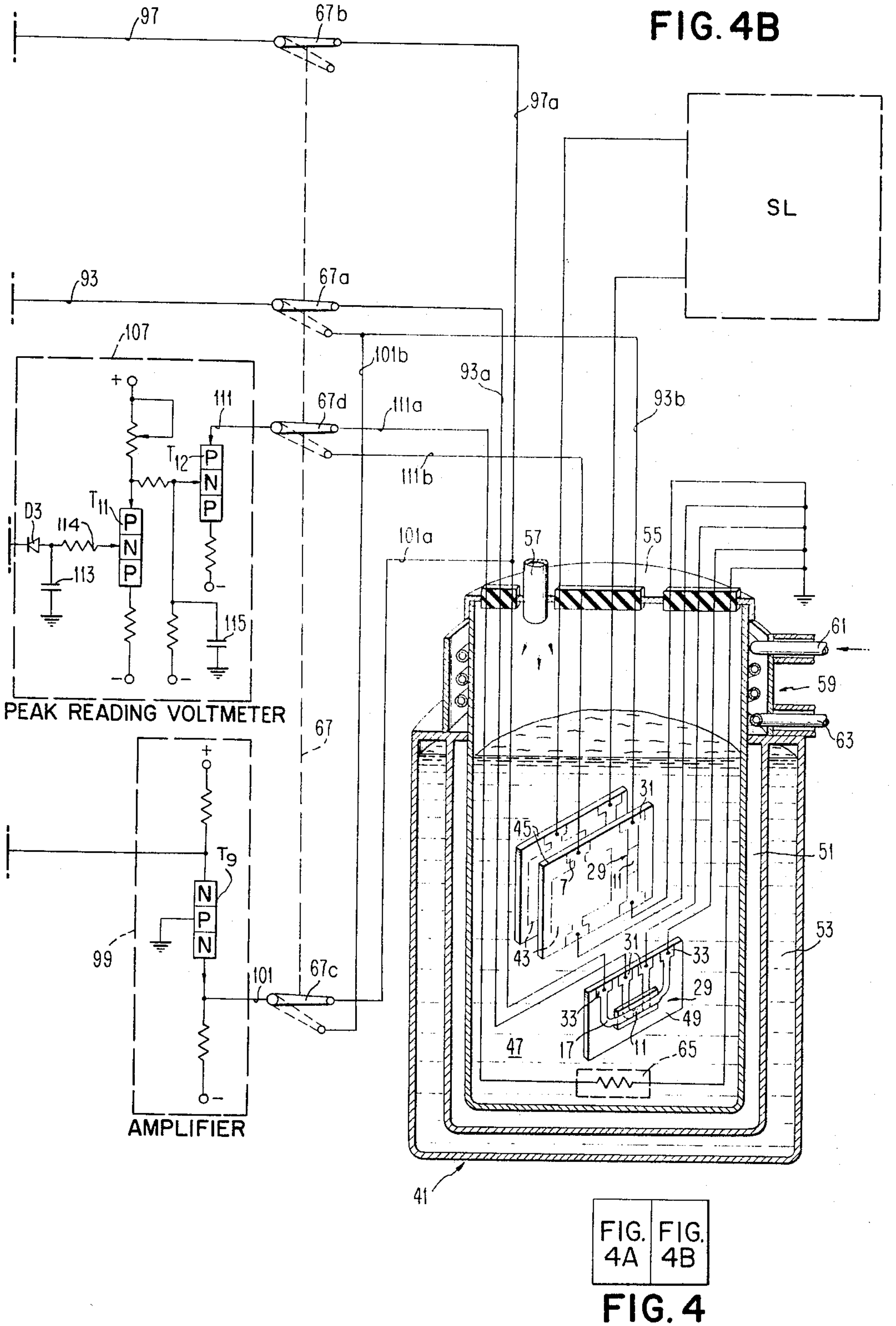

FIGS. 4A and 4B, when arranged in accordance with the key diagram of FIG. 4, illustrate a supervisory loop embodying the principles of this invention.

Figure 5:
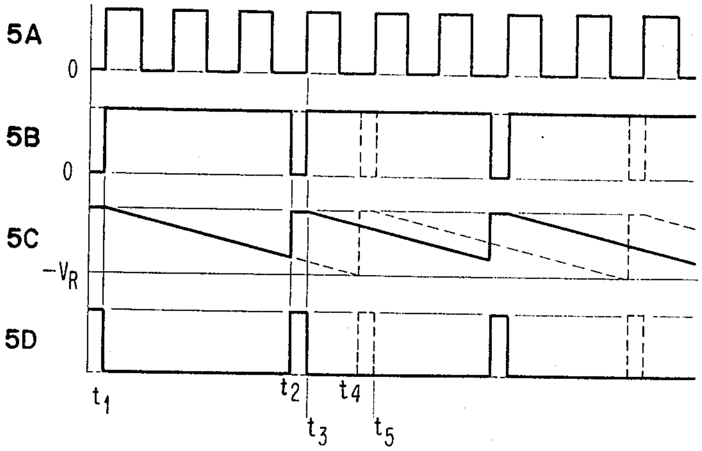

FIG. 5 is a series of curves illustrating the operation of the supervisory loop of FIGS. 4A and 4B.

Figure 1:
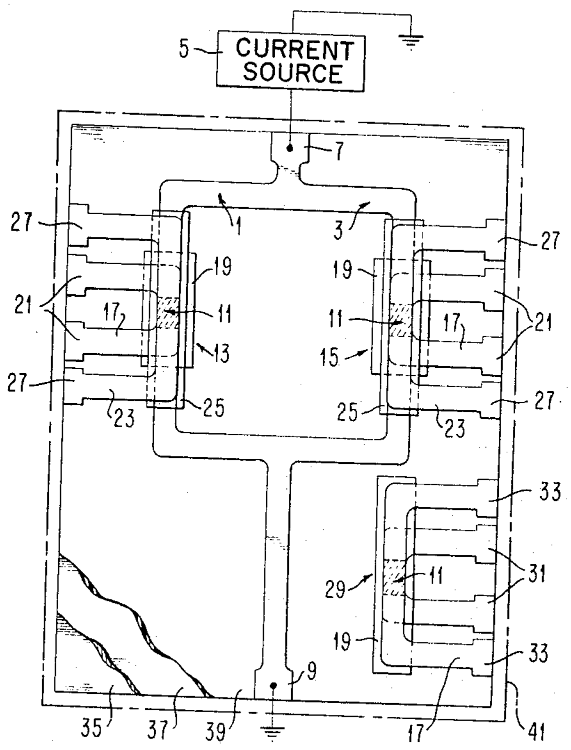
FIG. 1 illustrates a basic cryogenic arrangement.

To facilitate an understanding of this invention, reference is initially made to FIG. 1 wherein a basic cryogenic circuit arrangement is illustrated. The cryogenic circuit of FIG. 1 comprises two alternate or parallel superconductive paths 1 and 3 defining a superconductive loop and connected between a current source 5 and ground at land structures 7 and 9, respectively. Conductors 1 and 3 are formed of hard superconductive material, e.g. lead, except for segments of soft superconductive material, e.g. tin, forming the gate conductors 11 of cryotrons 13 and 15. Control conductors 17 of cryotrons 13 and 15 are registered in magnetic field applying relationship with the associated gate conductors 11 and are electrically insulated therefrom by a thin film of dielectric material 19. The control conductors 17 are each connected to a source of control current $I_c$, not shown, at land structure 21, respectively. In actual circuit applications, the gate current $I_g$ and control current $I_c$ are the same and are identified as working currents $I_w$.

In addition, cryotrons 13 and 15 each include a bias conductor 23 formed of a hard superconductive material. Each bias conductor 23 is registered with the associated gate conductor 11 and control conductor 17 and electrically insulated therefrom by a second thin layer of dielectric material 25. Bias conductors 23 are connected to a source of bias current $I_b$, not shown, at land structures 27. Bias conductors 23 generate a constant magnetic field $H_b$ which supplements the magnetic field $H_w$ generated by current $I_c$ along the control conductor 17 (see FIG. 2). As hereinafter described, the use of bias conductors minimizes ohmic heating during the dynamic operation of the cryotron circuit arrangement.

In addition, a monitoring cryotron 29 is illustrated which does not form an integral part of the circuit arrangement. Monitoring cryotron 29 includes a gate conductor 11 and a control conductor 17 in magnetic field applying relationship and electrically insulated by dielectric film 19. Gate conductor 11 and control conductor 17 of monitoring cryotron 29 are connected at each end to pairs of land structures 31 and 33, respectively.

The arrangement of FIG. 1 is formed by vacuum metalizing techniques onto, for example, a glass substrate 35 over which has been deposited a ground plane 37 of hard superconductive material and a thin layer of dielectric material 39. The superconductive materials forming strip conductors 1 and 3 and also gate conductors 11, control conductors 17 and also bias conductors 23 along with thin dielectric films 19 and 25 are deposited in turn through appropriate masking arrangements. The ground plane 37 serves as a magnetic shield to reduce inductance in the superconductive loop and also reduces high field effects along the edges of the gate, control, and bias conductors. It is to be understood that numerous cryotron arrangements as illustrated would be deposited in integrated fashion as an array onto a single substrate 35 along with a single monitoring cryotron 29.

In operation, current normally divides between the parallel strip conductors 1 and 3 in a ratio inversely proportional to the resistances included in each. As the cryotron arrangement is normally refrigerated by cryostat 41 below the critical transition temperature of the gate conductor material, alternate current paths 1 and 3 are normally superconductive. When current $I_c$ flows along the control conductor 17 of either cryotrons 13 or 15, superconductivity along the associated gate conductor 11 is destroyed and resistance is segmentally introduced along the strip conductor 1 or 3, respectively. Reversion of gate conductor 11 to a resistive state forces current from source 5 to flow entirely along the other strip conductor. When gate conductor 11 reverts to a superconductive state, i.e. upon termination of current $I_c$ along associated control conductor 17, current continues to flow entirely along the other strip conductor due to the inductance of the superconductive loop and also since no energy is available to cause the current to divide between the superconductive paths 1 and 3.

Generally, there are two thermal processes inherent in the switching of superconductive specimens, i.e. gate conductors 11, between different phase states. The first process relates to the latent heat associated with the phase transition of a gate conductor 11 between superconductive and normal resistance states. For example, when a superconductive specimen momentarily reverts to a normal resistance state, a quantity of heat is absorbed; however, a same quantity of heat is immediately released when the specimen reverts to the superconductive state. In effect, such transitions are thermodynamically reversible and, when averaged out over many switching cycles, do not introduce heat into the system. The second thermal process relates to ohmic heat generated during the dynamic operation of the cryogenic arrangement. Although the transition of a superconductive specimen between different phase states is essentially discontinuous, a finite time interval determined by the inductive time constants of the superconductive loop is required to completely switch current between alternate current paths 1 and 3. During this time interval, therefore, current $I_c$ along the superconductive path and gate conductor 11 switched to the resistance state decays nearly exponentially such that ohmic heating is generated in the gate conductor; in addition, slight ohmic heating is generated by eddy currents induced by magnetic fields $H_c$ penetrating gate conductor 11 while resistive. It can be shown that total heat dissipated in such process is equal to the sum of the energies stored electromechanically in the circuit at the start and at the conclusion of the switching process, i.e. $\frac{1}{2}LI_w^2$, where L is the inductance of the superconductive loop and $I_w$ is the working current directed along the superconductive paths 1 and 3 from source 5. This energy represents the bulk of the energy which must be dissipated.

Ohmic heat generated during the dynamic operation of a cryotron array is initially transferred to substrate 35 which, while acting as a conductor of heat, also acts as a heat reservoir whose specific heat determines the operating temperature of the cryogenic array and also of monitoring cryotron 29. As substrate 35 is generally immersed in a liquid helium bath contained within cryostat 41, a boundary is established therebetween which impedes heat transfer to the helium bath. Accordingly, substrate 35 forms, in effect, a thermal reservoir which tends to maintain the temperature of the cryogenic array slightly in excess of that of the local helium bath. In addition, temperature gradients exist within the liquid helium bath which can establish each of the array-supporting substrates 35 at a different operating temperature. Therefore, control of the helium bath temperature in cryostat 41 is, in and of itself, ineffective to stabilize the operation of each of the cryogenic arrays. Moreover, as temperature control of a helium bath cannot be effected immediately, there is a finite time interval wherein the operation of a cryotron can vary appreciably from the designed norm.

Figures 2, 3:
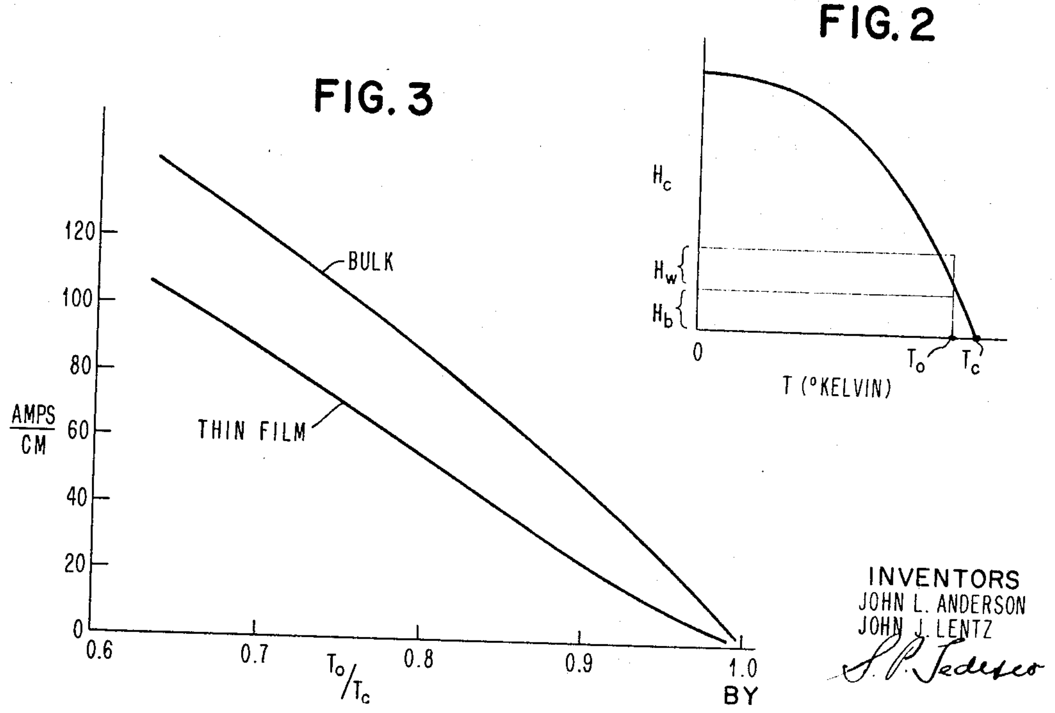
FIGS. 2 and 3 depict critical magnetic fields and critical self-currents, respectively, of a superconductive specimen plotted as a function of temperature.

The temperature sensitivity of a cryotron can be more fully appreciated upon consideration of FIGS. 2 and 3 wherein critical magnetic field $H_c$, i.e. current $I_c$ along control conductor 17, and also critical self-current $I_s$, i.e. the current $I_g$ along a gate conductor 11, respectively, required to destroy superconductivity along the gate conductor are plotted as a function of temperature T. As temperature T is decreased from the critical transition temperature $T_c$, the magnitude of the critical magnetic field $H_c$ and also the critical self-current $I_s$ increase; moreover, as the slope of each of these curves of FIGS. 2 and 3 is sufficiently large, small variations in temperature T have pronounced effects on each of these quantities. It is conceivable that ohmic heating could increase operating temperature $T_o$ of a cryogenic array sufficiently such that (1) the working current $I_w$, i.e. current $I_g$, exceeds the critical self-current $I_s$ or (2) the biasing magnetic fields $H_b$ generated by current $I_b$ along bias conductors 23 exceed the critical magnetic fields $H_c$ so as to destroy superconductivity along a gate conductor 11. If the temperature of cryostat 41 were reduced to compensate the operating temperature $T_o$ of more operated cryogenic arrays, the operating temperature $T_o$ of less operated cryogenic arrays could be reduced such that the magnetic fields $H_w$ generated by working currents $I_w$, e.g. current $I_c$ along a control conductor 17, are insufficient to switch the associated gate conductor 11 to a resistive state.

The operation of any number of cryogenic arrays immersed in a common helium bath contained in cryostat 41 can be individually stabilized by regulating the magnitude of the working currents $I_w$ or the bias current $I_b$ supplied to each array in accordance with variations in the operating temperature $T_o$ while optimizing the local helium bath temperature with respect to the cryogenic arrays. As hereinafter described, regulation of working currents $I_w$ and bias currents $I_b$ can be effected immediately; however, due to thermal time constants, a finite time interval is required to regulate the temperature of the helium bath in cryostat 41. As the local helium bath temperature is compensated, however, compensation of the working currents is reduced. When the temperature of the helium bath in cryostat 41 has been optimized, variations in the ambient temperature of an array-supporting substrate 35 from the designed operating temperature T is compensated by regulation of the working currents $I_w$ and/or the bias currents $I_b$.

The operation of any number of cryotron arrays 43 contained in cryostat 41 can be stabilized in accordance with the principles of this invention by the arrangement of FIG. 4. As illustrated a plurality of substrates 45 each supporting a cryotron array 43 and a monitoring cryotron 29 are immersed in a liquid helium bath 47 contained in Dewar-type cryostat 41; only gate conductors 11 of the monitoring cryotrons 29 are shown. In addition, any number of additional substrates 49 each supporting a monitoring cryotron 29 are selectively positioned to monitor temperature gradients within the helium bath 47.

Cryostat 41 comprises a vacuum jacket 51 and a liquid nitrogen jacket 53 to thermally isolate the liquid helium bath 47 and is sealed by a lid 55. The interior of cryostat 41 is connected along a conduit 57 to a source of constant pressure. A vacuum-jacketed condenser unit 59 comprising a series of coils is positioned about the upper portion of cryostat 41. As indicated by the arrows, liquid helium is directed into condenser 59 along the conduit 61 from a liquid helium source, not shown, and returned to the helium source along conduit 63. The condenser 59 is operative to condense helium vapors passing upwardly which, when condensed, fall back to the helium bath 47. The process of continuous evaporation and condensation of the helium vapors transfers heat from the helium bath 47 to the condenser 59.

A heater element 65 is positioned within helium bath 47 and is controlled to maintain heat loss within cryostat 41 constant. Heat loss within the system includes ohmic heating by the cryogenic arrays 43 and also heating introduced from without the cryostat 41. As these sources of heat are not precisely controllable, heater element 65 compensates for variations from each of these sources so as to maintain total heat loss within the system constant. Although a single heater element is shown, it is obvious that any number of heater elements 65 can be selectively positioned to optimize the helium bath temperature on a local basis.

A supervisory loop illustrated in FIGS. 4A and 4B is operative to modulate either working currents $I_w$ or biasing currents $I_b$ applied to a particular cryogenic array 43 or current to heater element 65 in accordance with variations in the operating characteristics of monitoring cryotron 29 supported on substrates 45 or 49, respectively. In the interest of simplicity, a single supervisory loop is illustrated as connectable through ganged contacts 67 to monitoring cryotrons 29 supported on either substrates 45 or 49, respectively. It should be understood, however, that a supervisory loop as shown would be associated with each monitoring cryotron 29 whereby each of the quantities can be regulated concurrently. As the particular transistor circuit arrangements shown do not constitute a part of the invention, the supervisory loop is substantially illustrated in block form and hereinafter functionally described.

The supervisory loop includes trigger arrangement 71 which is adapted to initiate and complete successive monitoring cycles and also control the amount of compensation introduced to the system. Trigger arrangement 71 comprises PNP junction transistors $T_1$ and $T_2$ arranged in conventional bistable fashion. At the end of each monitoring cycle, trigger arrangement 71 is reset such that transistor $T_2$ is nonconducting and transistor $T_1$ is conducting. While trigger arrangement 71 is reset, the resultant positive rise in collector voltage of transistor $T_1$ as applied along lead 73 disables gate arrangement 75 to inhibit the supervisory loop.

Gating arrangement 75 comprises PNP junction transistor $T_3$ and NPN junction transistor $T_4$ arranged in tandem. The emitter electrode of transistor $T_3$ is connected along lead 73 to the collector electrode of transistor $T_1$. Voltage divider 77 biases transistor $T_3$ so as to be conducting while trigger arrangement 71 is reset, i.e. transistor $T_1$ is conducting. The resultant rise in collector voltage of transistor $T_3$ is sufficient to forward bias transistor $T_4$ such that the collector voltage of the latter, i.e. the output voltage of gate arrangement 75, is substantially zero volts.

Clock source 69 directs a series of positive pulses illustrated in FIG. 5A to trigger arrangement 71. At time $t_1$, therefore, trigger arrangement 71 is set whereby transistor $T_1$ is nonconducting and transistor $T_2$ is conducting. The resultant collector voltage swing of transistor $T_1$ is effective to reverse bias transistor $T_3$. Accordingly, transistor $T_4$ is driven out of conduction and the output of gating arrangement 75 swings positively. As trigger arrangement 71 is successively set and reset, as hereinafter described, a series of positive pulses illustrated in FIG. 5B appears at the output A of gating arrangement 75. The series of positive pulses at point A are applied concurrently to ramp driver 79 and gate driver 81 which generate current drive pulses shown in FIGS. 5C and 5D, respectively. As hereinafter described, the duration of the pulses appearing at point A narrow or widen in accordance with changes in the switching characteristics of a monitoring cryotron 29 due to variations in the local helium bath temperature.

Ramp driver 79 comprises PNP transistors $T_5$ and $T_6$; transistor $T_5$ is adapted to control the charging and discharging of ramp generating capacitor 87. During the quiescent state and while point A is at zero volts, transistor $T_5$ is normally conducting and provides a low impedance discharge path for capacitor 87. At time $t_1$, i.e. when trigger arrangement 71 is set, the positive rise in voltage at point A is applied to ramp driver 79 and ramp generating capacitor 87 is charged negatively by voltage source 89. Variable resistor 91 is adjusted to control the rate of charging of capacitor 87. The voltage developed across the capacitor 87-resistor 91 arrangement is applied to the base electrode of transistor $T_6$ which is arranged as an emitter follower and generates a negative-going ramp signal as illustrated in FIG. 5C. The ramp signal thus generated follows linearly the voltage developed across the capacitor 87-resistor 91 arrangement. The output of ramp driver 79, i.e. the emitter electrode of transistor $T_6$ is connected along lead 93 to switch contact 67*a*. When the positive signal at point A is terminated, at time $t_2$, i.e. when trigger arrangement 71 is reset and gate arrangement 75 is disabled, transistor $T_5$ again conducts to discharge ramp generating capacitor 87 and reverse bias transistor $T_6$ whereby the negative-going ramp signal is terminated.

The gate driver 81, on the other hand, comprises PNP transistors $T_7$ and $T_8$. During the quiescent state and while point A is at zero volts, transistor $T_7$ is normally conducting and transistor $T_8$ is reversed biased. At time $t_1$, the positive rise in voltage at point A is effective to reverse bias transistor $T_7$; the resultant negative swing in collector voltage of transistor $T_7$ drives transistor $T_8$ into conduction. Conduction in transistor $T_8$ results in a negative-going signal, shown in FIG. 5D, at the output of gate driver 81, i.e. the emitter electrode of transistor $T_8$, which is connected along lead 97 to switch contact 67*b*. The amplitude of the negative-going signal is determined by the setting of variable resistor 95. When the positive signal at point A is terminated at time $t_2$, as hereinafter described, transistor $T_7$ again conducts to reverse bias transistor $T_8$.

When ganged contacts 67 are in a closed position, as shown, the outputs of ramp driver 79 and gate driver 81 are connected along leads 93*a* and 97*a*, respectively, to a control conductor land 33 and a gate conductor land 31, respectively, of monitoring cryotron 29 on substrate 49; corresponding lands 33 and 31 are multipled to ground. At time $t_1$, therefore, a current pulse of constant magnitude, shown in FIG. 5D and hereinafter identified as $I_c$, flows along gate conductor 11 of monitoring cryotron 29; concurrently, a current pulse of increasing magnitude, shown in FIG. 5C and hereinafter identified as $I_c$, flows along control conductor 17 of monitoring cryotron 29. At time $t_2$, current $I_c$ along the control conductor 17 has increased sufficiently to generate the critical magnetic fields $H_c$ of gate conductor 11 at the present operating temperature $T_0$ and the gate conductor is switched resistive. The magnitude of the critical magnetic fields $H_c$, however, are dependent on the ambient temperature of the monitoring cryotron 29 as shown in FIG. 2. It is evident that current switching techniques could be similarly employed. Accordingly, time $t_1$–$t_2$ is variable and is a function of the present operating temperature $T_0$ of monitoring cryotron 29. For example, if the operating temperature $T_0$ of monitoring cryotron 29 is reduced, the time interval $t_1$–$t_2$ increases since a larger magnitude of control conductor current $I_c$ is required to switch gate conductor 11 resistive; conversely, time interval $t_1$–$t_2$ decreases as the operating temperature $T_0$ of the monitoring cryotron is raised.

The reversion of gate conductor 11 of monitoring cryotron 29 to a resistive state is sensed by amplifier arrangement 99 comprising an NPN transistor $T_9$. The input of amplifier arrangement 99, i.e. the emitter electrode of transistor $T_9$, is connected along leads 101 and 101*a* along switch contact 67*c* to the gate conductor 11 of monitoring cryotron 29 on substrate 49. Transistor $T_9$ is normally nonconducting since the emitter electrode is at ground potential along the superconductive gate electrode 11. When the gate conductor 11 reverts to a resistive state at time $t_2$, however, the resultant voltage drop developed thereacross is sufficient to drive transistor $T_9$ into conduction. At time $t_2$, therefore, gate driver 81 and ramp driver 79 are operated, gate conductor 11 is resistive, and transistor $T_9$ is conducting.

The output of amplifier arrangement 99, i.e. the collector electrode of transistor $T_9$, is connected to the cathode of diode D1 in OR gate arrangement 103; the cathode of a second diode D2 is connected to the capacitor 87-resistor 91 arrangement of ramp driver 79. Diode D2 is biased to conduct when ramp generating capacitor 87 is charged to a negative voltage $V_R$ indicated in FIG. 5C; conversely, diode D1 is biased to conduct when amplifier arrangement 99 is operated upon gate conductor 11 of monitoring cryotron 29 reverting to a resistive state. The output of OR gate arrangement 103 is connected to an inverter amplifier arrangement 105 comprising PNP transistor $T_{10}$ which amplifies and sharpens the output of OR gate arrangement 103. The output of amplifier arrangement 105, i.e. the collector electrode of transistor $T_{10}$, is connected to trigger arrangement 71 at the base electrode of transistor $T_2$. Amplifier arrangement 105, when operated, resets trigger arrangement 71 to drive transistor $T_1$ into conduction and transistor $T_2$ out of conduction. The resultant rise in collector voltage of transistor $T_1$ as applied along lead 73 forward biases transistor $T_3$ and gate arrangement 75 is disabled to complete the monitoring cycle. Accordingly, the output voltage of the gate arrangement 75 at point A falls to approximately zero volts and both ramp driver 79 and gate driver 81 are disabled. A subsequent monitoring cycle is initiated at time $t_3$ when the next clock pulse from source 69 sets trigger arrangement 71.

The dashed extensions of the wave forms shown in

FIGS. 5B, 5C, and 5D illustrate that condition when the helium bath temperature is reduced to a level whereat ramp current $I_c$ along control conductor 17 is not sufficient to drive the gate conductor 11 of monitoring cryotron 29 resistive. This condition, for example, might occur when the cryogenic system is first turned on. When the ramp signal developed across ramp generating capacitor 87-variable resistor 91 exceeds voltage $V_R$ at time $t_4$, see FIG. 5C, diode D2 in OR gate arrangement 103 conducts and amplifier arrangement 105 is operative to reset trigger arrangement 71. A subsequent monitoring cycle would be initiated at time $t_5$ when a next clock pulse from source 69 sets trigger arrangement 71. The supervisory loop is disabled, therefore, when either gate conductor 11 of monitoring cryotron 29 has driven resistive or the ramp signal generated across the capacitor 87-resistor 91 arrangement exceeds the voltage $V_R$. As hereinafter described, maximum current is supplied under these conditions to heater element 65.

As hereinabove indicated, variations in time interval $t_1$–$t_2$ are indicative of heat loss changes in the system. To maintain heat loss constant and stabilize the temperature of the helium bath 47, current supplied to heat element 65 is regulated in accordance with variations in the duration of the monitoring cycle, i.e. the time interval $t_1$–$t_2$. The duration of the monitoring cycle is indicated, for example, by the duration of the positive pulses appearing at point A or at the output of gate driver 81 and also by either the magnitude or duration of the ramp signal $I_c$ necessary to switch the monitoring cryotron 29. In the illustrative embodiment, for example, the magnitude of current through heater 65, and, therefore, the amount of heat loss into helium bath 47 is determined in accordance with the magnitude of the ramp signal developed across the capacitor 87-resistor 91 arrangement. To this end, a peak-reading voltmeter arrangement 107 comprising transistors $T_{11}$ and $T_{12}$ is employed. Meter arrangement 107 is connected along lead 109 to the capacitor 87-resistor 91 arrangement. The output of meter arrangement 107, i.e. the emitter electrode of transistor $T_{12}$, is connected along leads 111 and 111*a* through switch contact 67*d* to heater element 65. As the ramp signal is generated across the capacitor 87-resistor 91 arrangement, capacitor 113 through diode D3 charges to forward bias transistor $T_{11}$; resistor 114 connecting diode D3 to the base electrode of transistor $T_{11}$ minimizes loading on capacitor 113. Conduction in transistor $T_{11}$ determined the charge developed across a second capacitor 115 to bias the base electrode of transistor $T_{12}$. The emitter-collector circuit of transistor $T_{12}$ is connected in series with heater element 65. Transistor $T_{12}$ is normally slightly forward biased to normally supply a predetermined current to heater element 65. As the temperature of the helium bath varies, for example, due to the quantity of ohmic heating by cryogenic arrays 43, time interval $t_1$–$t_2$ and, therefore, the magnitude of the ramp signal developed across capacitor 87-resistor 91 arrangement varies. The charge developed across capacitor 115 is modified accordingly to regulate emitter current of transistor $T_{12}$ flowing through heater element 65 whereby the helium bath 47 is established at an optimum temperature with respect to the ohmic heating generated by the cryogenic arrays 43.

The supervisory loop has been described as operative to control current to heat element 65 in accordance with variations in the field switching characteristics of monitoring cryotron 29 due to changes in the temperature of the helium bath 47. There is a certain delay, however, before the temperature of the helium bath 47 can be optimized with respect to cryogenic arrays 43; moreover, due to temperature gradients within the helium bath, array-supporting substrates 45 are not maintained at a same temperature. In accordance with another aspect of this invention, a substantially similar supervisory loop can be adapted to precisely regulate the bias currents $I_b$ and/or the working currents $I_w$ supplied to each cryogenic array 43 in accordance with variations in either the field switching or current switching characteristics of monitoring cryotron 29 supported on substrate 45 while the temperature of helium bath 47 is being optimized. Such regulation minimizes ohmic heating generated during the dynamic operation of the system and insures proper operation of the cryogenic array 43.

For purposes of description, the supervisory loop hereinabove described is illustrated as connectable along ganged contacts 67 to an array-supporting substrate 45; a supervisory loop SL would be connected to each of the array-supporting substrates 45. It is to be understood that supervisory loops connected to each of the array-supporting substrates 45 and also substrate 49 are operative concurrently. When switch 67 is in phantomed position, the outputs of the ramp driver 79 and meter arrangement 107 are connected along switch contacts 67*a* and 67*d*, respectively, and along leads 93*a* and 93*b* and also 101*a* and 101*b*, respectively, at land structures 31 and 7, respectively, on substrate 45; the input to amplifier arrangement 99 is connected along contact 67*c* and along leads 101*a* and 101*b* and 93*b* at land structure 7. When bias currents $I_b$ to the cryogenic array 43 are to be regulated, the output of meter arrangement 107 is connected at land structure 33 (compare FIG. 1). Gate driver 81 is effectively disconnected from the circuit at switch contact 67*b*. At time $t_1$, therefore, the negative-going ramp signal generated by ramp driver 79 and illustrated in FIG. 5C is applied as gate current $I_g$ to gate conductor 11 of monitoring cryotron 29. When current $I_g$ exceeds the critical self-current $I_s$ of the gate conductor at the present operating temperature $T_o$, say at time $t_2$, reversion of gate conductor 11 to a resistive state is detected by amplifier arrangement 99 and a monitoring cycle is completed, as described above. The time interval $t_1$–$t_2$, therefore, is indicative of the present operating temperature $T_o$ of monitoring cryotron 29 and, therefore, cryogenic array 43 and is determinative of the regulation to be provided to the working current $I_w$ and/or the bias currents $I_b$.

The meter arrangement 107 controls the magnitude of the bias currents $I_b$ and/or the working currents $I_w$ supplied to cryogenic array 43 in accordance with the magnitude of the ramp signal. Referring to FIG. 2, the total magnetic field applied to gate conductor 11 is the total of the magnetic field $H_b$ generated by bias currents $I_b$ along bias conductor 23 and the magnetic field $H_w$ generated by current $I_c$ along control conductor 17 (see FIG. 2). The total magnetic field, therefore, is determined just slightly in excess of the critical magnetic field $H_c$ at the particular operating temperature $T_o$ of the cryogenic array 43. To compensate for variations in operating temperature $T_o$, the magnitudes of bias current $I_b$ and/or the working current $I_w$ are increased or decreased so as to maintain this excess. In the present embodiment, the output of meter arrangement 107 regulates the working current $I_w$, i.e. control current $I_c$ supplied to the cryogenic array 43 at land 7, so as to determine the magnitude of the magnetic field $H_w$; a bias current $I_b$ of constant magnitude is supplied to the bias conductor 23 to generate magnetic fields $H_b$. Conversely, the output of meter arrangement 107 could be connected to the land 27 so as to regulate bias current $I_b$ while working currents $I_w$ supplied at land 7 are maintained constant.

It is evident that the above-identified arrangement can be modified to provide closed-loop control. For example, monitoring cryotrons 29 can be provided with a bias conductor 17. Working currents $I_w$ or bias currents $I_b$ supplied to the cryogenic array 43, therefore, are varied in accordance with variations in the bias currents $I_b$ supplied to bias conductor 17 of monitoring cryotron 29 necessary to maintain time interval $t_1$–$t_2$ constant. In either event, proper operation of the cryogenic array is insured regardless fo variations in the local helium bath temperature and ohmic heat generated by the cryogenic array 43 is minimized.

While the invention has been particularly shown and described with reference to preferred embodiments thereof, it will be understood by those skilled in the art that various changes in form and details may be made therein without departing from the spirit and scope of the invention.

What is claimed is:

1. In a cryogenic system, liquid refrigerant means, an array of cryotron devices whose operation parameters vary with temperature and a monitoring cryotron whose operation parameters vary with temperature arranged within said liquid refrigerant means so as to be maintained at a same operating temperature, the operation of said array introducing heat loss within said liquid refrigerant means whereby the operating temperature of said array and said monitoring cryotron is varied, first means for periodically applying signals of time-varying amplitude to said monitoring cryotron, the amplitude and duration of said signals being at least sufficient to switch said monitoring cryotron, the amplitude of said signals required to switch said monitoring cryotron being a function of operating temperature, and means responsive to said monitoring cryotron for stabilizing the operation parameters of said array in accordance with variations in the duration of said time-varying signals required to switch said monitoring cryotron.

2. In a cryogenic system as defined in claim 1 wherein said monitoring cryotron includes a gate conductor and a control conductor, said first means being operative to periodically apply said time-varying signals to said control conductor, and further including additional means operative concurrently with said first means for applying a signal of substantially constant amplitude to said gate conductor.

3. In a cryogenic system as defined in claim 1 wherein said monitoring cryotron includes a gate conductor, said first means being operative to periodically apply said time-varying signals to said gate conductor, said time-varying signals being at least in excess of the Silsbee current $I_s$ of the gate conductor material.

4. In a cryogenic system as defined in claim 1 further including means responsive to said cryotron device upon switching to inhibit said first means, and means for enabling said first means to apply a next time-varying signal.

5. In a cryogenic system as defined in claim 1 further including an additional cryotron for monitoring the temperature of said liquid refrigerant means, second means for periodically applying said signals of time-varying amplitude to said additional monitoring cryotron, and means for compensating said liquid refrigerant means in accordance with variations in the duration of said time-varying signals required to switch said additional monitoring cryotron.

6. In a cryogenic system, liquid refrigerant means, an array of cryotron devices and a juxtaposed monitoring cryotron immersed in said refrigerant means so as to be maintained at substantially a same operating temperature, dynamic operation of said array introducing heat loss to vary the temperature of said liquid refrigerant means whereby the operating temperature of said array and also said monitoring cryotron vary from said operating temperature, switching characteristics of cryotron devices forming said array and also said monitoring cryotron varying as a function of temperature, means for periodically ascertaining variations in switching characteristics of said monitoring cryotron due to variations in temperature of said liquid refrigerant means, and means for stabilizing the switching characteristics of said array in accordance with said variations in switching characteristics of said monitoring cryotron.

7. In a cryogenic system as defined in claim 6 wherein said compensating means includes means for regulating operating currents supplied to said cryogenic array.

8. In a cryogenic system as defined in claim 6 wherein said compensating means includes means for regulating the temperature of said liquid refrigerant means.

9. In a system, an array of temperature sensitive components immersed in said liquid bath, first means for introducing a controlled heat loss within said liquid bath, dynamic operation of said array introducing additional heat loss within said liquid bath whereby the temperature of said liquid bath is varied, a first component for monitoring the temperature of said liquid bath, the switching characteristics of said first monitoring component varying as a function of temperature, second means for periodically ascertaining variations in said switching characteristics of said first monitoring component due to variations in temperature of said liquid bath, and means responsive to said second means for regulating said first means such that total heat loss introduced within said liquid bath is constant.

10. In a system as defined in claim 9 further including a second component adapted to be maintained at a same temperature as said array, the switching characteristics of said second component also varying as a function of temperature, third means for supplying operating currents to said array, and fourth means for periodically ascertaining variations in said switching characteristics of said second component, said third means being responsive to said fourth means for regulating operating currents supplied to said array in accordance with variations in said switching characteristics of said second component.

11. In a system, liquid refrigerant means, an array of cryotrons and a monitoring cryotron immersed in said liquid refrigerant means so as to be maintained at a same operating temperature, the dynamic operation of said array introducing heat loss within said liquid refrigerant means whereby the operating temperature of said array and also said monitoring cryotron is varied, the switching characteristics of said cryotrons forming said array and also said monitoring cryotron varying as a function of temperature, a supervisory loop disposed exterior of said liquid refrigerant means for stabilizing the operation of said array, said loop including means for periodically applying signals of time-varying amplitude to said monitoring cryotron, the maximum amplitude of said signals being at least sufficient to switch said monitoring cryotron, means for ascertaining variations in the switching characteristics of said monitoring cryotron due to variations in said operating temperature resulting from heat loss introduced within said liquid refrigerant means, and means responsive to said ascertaining means in said supervisory loop for regulating working current supplied to said array in accordance with said variations in said switching characteristics of said monitoring cryotron.

12. In a cryogenic system, liquid refrigerant means, an array of cryotrons and a monitoring cryotron arranged in said liquid refrigerant means so as to be maintained at substantially a same operating temperature, the operation of said array generating ohmic heat whereby heat loss is introduced into said liquid refrigerant means and said operating temperature is varied, the switching characteristics of said cryotrons forming said array and also said monitoring cryotron varying as a function of temperature, means for supplying working currents to said array, means for periodically switching said monitoring cryotron, means for ascertaining variations in the switching characteristics of said additional cryotron due to introduction of heat loss in said liquid refrigerant during operation of said array, and means responsive to said last-mentioned means for controlling said supplying means to regulate said working currents supplied to said array to insure operation of said array regardless of variations in said operating temperature while minimizing ohmic heat generated by said array during dynamic operation.

13. In a cryogenic system, a supervisory loop for stabilizing the operation of an array of cryotrons supported on a substrate, a monitoring cryotron supported on said same substrate, liquid refrigerant means for receiving said substrate whereby said array and said monitoring cryotron are maintained at a same operating temperature, the switching characteristics of said cryotrons forming said array and said monitoring cryotron varying as a function of temperature, first means for periodically applying signals of time-varying amplitude to switch said monitoring cryotron, the maximum amplitude of said signals thus supplied being at least sufficient to switch said monitoring cryotron, and means for regulating working currents supplied to said array in accordance with variations in the amplitude of said current signals necessary to switch said monitoring cryotron.

14. In a cryotron system as defined in claim 13 wherein said last-mentioned means are operative to regulate bias currents supplied to said array in accordance with variations in the amplitude of said signals necessary to switch said monitoring cryotron.

15. In a cryotron system as defined in claim 13 wherein said first means are operative to apply said signals of time-varying amplitude along said gate conductor of said monitoring cryotron, said gate conductor of said monitoring cryotron and the gate conductors of said cryotrons in said array being formed of a same superconductive material.

16. In a cryotron system as defined in claim 13 wherein said first means are operative to apply said signals of time-varying amplitude along the control conductor of said monitoring cryotron, and means for concurrently supplying a constant signal along said gate conductor of said monitoring cryotron, said gate conductor of said monitoring cryotron and the gate conductors of said cryotrons in said array being formed of a same superconductve material.

17. In a cryotron system as defined in claim 13 further including means connected to and operative upon switching of said monitoring cryotron for inhibiting said first means whereby the durations of said current signals are limited and ohmic heat generated by said monitoring cryotron is minimized, and means for enabling said first means to apply a next time-varying signal to said monitoring cryotron.

References Cited by the Examiner

UNITED STATES PATENTS

| | | | |
|---|---|---|---|
| 2,189,122 | 2/1940 | Andrews | 307—88.5 |
| 2,376,488 | 5/1948 | Jones | 236—68 |
| 2,754,063 | 7/1956 | Hersten | 328—4 |
| 3,209,172 | 9/1965 | Young | 307—88.5 |

ARTHUR GAUSS, *Primary Examiner.*

B. P. DAVIS, *Assistant Examiner.*